United States Patent
Christensen et al.

(10) Patent No.: US 7,252,813 B2
(45) Date of Patent: Aug. 7, 2007

(54) PROCESS FOR CONDENSATION OF SULPHURIC ACID VAPOURS TO PRODUCE SULPHURIC ACID

(75) Inventors: Kurt Agerbæk Christensen, Birkerød (DK); Peter Schoubye, Hørsholm (DK)

(73) Assignee: Haldor Topsoe A/S, Lyngby (DK)

( * ) Notice: Subject to any disclaimer, the term of this patent is extended or adjusted under 35 U.S.C. 154(b) by 664 days.

(21) Appl. No.: 10/732,222

(22) Filed: Dec. 11, 2003

(65) Prior Publication Data
US 2004/0141909 A1    Jul. 22, 2004

(30) Foreign Application Priority Data
Jan. 18, 2003   (DK) ................. 2003 00045

(51) Int. Cl.
*C01B 17/74* (2006.01)
(52) U.S. Cl. ............... 423/522; 423/523; 423/529
(58) Field of Classification Search ............ 423/522, 423/523, 529
See application file for complete search history.

(56) References Cited
U.S. PATENT DOCUMENTS

| | | | |
|---|---|---|---|
| 4,348,373 A | 9/1982 | Schoubye | |
| 4,696,804 A | 9/1987 | Shinoda et al. | |
| 5,108,731 A | 4/1992 | Schoubye | |
| 5,122,352 A * | 6/1992 | Johnson | 423/243.12 |
| 5,198,206 A * | 3/1993 | Schoubye | 423/522 |
| 5,683,670 A * | 11/1997 | Peng | 423/522 |

FOREIGN PATENT DOCUMENTS

| | | |
|---|---|---|
| DE | 21 22 634 | 11/1972 |
| WO | WO 89/12024 | 12/1989 |
| WO | WO 89/12025 | 12/1989 |

* cited by examiner

Primary Examiner—Timothy C. Vanoy
(74) Attorney, Agent, or Firm—Dickstein Shapiro LLP

(57) ABSTRACT

A process for production of sulphuric acid comprising condensing sulphuric acid vapour from a gas mixture containing 0.01 to 10 vol. % of $H_2SO_4$ vapour calculated at complete hydration of $SO_3$ in the gas to $H_2SO_4$ and 0 to 50 vol. % of water vapour by cooling of the gas in a sulphuric acid tower, wherein a stream containing $NH_3$ is added upstream of the tower in an amount corresponding to 0.01–100 ppm $NH_3$ by vol. in the gas stream at the entry of the tower.

8 Claims, 2 Drawing Sheets

PROCESS FOR CONDENSATION OF SULPHURIC ACID VAPOURS TO PRODUCE SULPHURIC ACID

BACKGROUND OF THE INVENTION

The present invention relates to a process for production of sulphuric acid by condensation of sulphuric acid vapours from a gas mixture containing 0.01-10 vol. % of $H_2SO_4$ vapour calculated under the assumption that $SO_3$ is fully hydrated and 0-50 vol. % of water vapour.

Sulphuric acid is in many cases produced from gases containing $H_2SO_4$ vapour and water vapour by condensation in a cooling process. However, it is known that by cooling and condensation of sulphuric acid vapours in gases containing water vapour a sulphuric acid mist is formed, i.e. an aerosol of small droplets of sulphuric acid.

From European Patent No. 0 417 200 B1 and U.S. Pat. No. 5,108,731 a process is known for production of sulphuric acid, in which sulphuric acid vapours in gas mixtures containing 0.01-10% $H_2SO_4$ vapour and 0-50% water vapour are condensed in vertical, acid-resistant tubes cooled externally with air or gas. The presence of large amounts of acid mist in the gas after condensation is avoided according to this patent by keeping the temperature difference between the sulphuric-acid containing gas flowing in an upward direction and the gaseous coolant flowing in a downward direction within certain specified limits. Most of the sulphuric acid mist generated during condensation may then be captured in a high-velocity aerosol fibre filter placed in top of each of the tubes as described in the patent.

In European Patent No. 0 419 539 B1 and U.S. Pat. No. 5,198,206 it is shown how the amount of acid mist escaping from condensation of sulphuric acid vapours from a gas mixtures containing 0.01-10% $H_2SO_4$ vapour and 0-50% water vapour can be reduced to below 10-15 ppm $H_2SO_4$ by adding solid particles to the gas before entering the condensation tower. The particles act as condensation nuclei for the sulphuric acid vapours and supress spontaneous homogeneous nucleation of small sulphuric acid droplets which are not easily captured in filtering devices.

In the following, the expression "sulphuric acid tower" means a packed absorption tower as described in U.S. Pat. No. 4,348,373 or a tower containing tubes as described in European Patent No. 0 417 200 B1.

DESCRIPTION OF THE INVENTION

Figure 1:
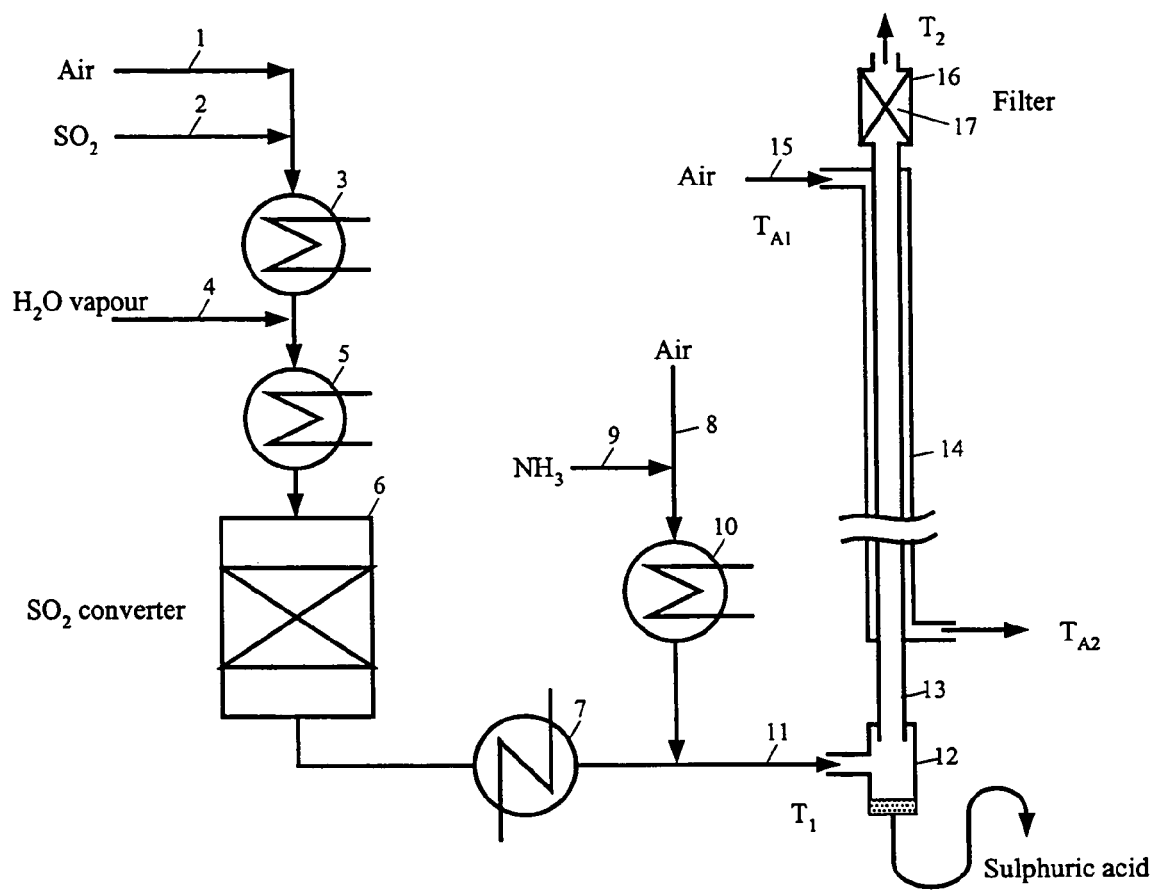
FIG. 1 shows the operation of an industrial-scale sulphuric acid plant.

It has been found that the amount of acid mist in the gas downstream from a sulphuric acid condensation tower can be dramatically reduced if a small amount of $NH_3$ is added to the gas entering the tower.

According to the invention, acid mist reduction by $NH_3$ addition may be carried out during sulphuric acid condensation by cooling in a packed sulphuric acid tower in counter-current with circulating sulphuric acid as coolant as described in the process known from U.S. Pat. No. 4,348,373.

The process according to the invention may also be practised under cooling of the gas mixture containing sulphuric acid in substantially vertical, externally cooled tubes in which the gas mixture flows from the bottom in an upward direction in countercurrent with a preferably gaseous external coolant, i.e. in accordance with European Patent No. EP 0 417 200 B1.

A preferred embodiment of the invention comprises production of sulphuric acid in which sulphuric acid vapours in gas mixtures containing 0.01-10% $H_2SO_4$ vapour and 0-50% water vapour are condensed in vertical, externally cooled, acid-resistant tubes according to U.S. Pat. No. 5,198,206. The gas is admitted from the bottom of the tubes at a temperature $T_1$ above its dew point. The feed gas is cooled during the flow in the upward direction to a temperature $T_2$ at which its $H_2SO_4$ vapour pressure is below $2 \cdot 10^{-6}$ bar. In the top of each tube, a small fibre filter causing a pressure drop of typically 2-10 mbar captures the sulphuric acid droplets present in the gas and the sulphuric acid, which is typically 50-80 wt % $H_2SO_4$ drains back to the tube where it is concentrated to 93-98.5 wt % $H_2SO_4$ as it flows in the downward direction. The tubes are cooled externally with a gaseous medium flowing counter-currently or in countercurrent cross-flow with the sulphuric acid-containing gas, where the gaseous medium thereby is heated from an inlet temperature $T_{A1}$ of 0 to 50° C. to an outlet temperature $T_{A2}$ satisfying the condition:

$$T_{A2} > T_1 - (75 - 6 \cdot S - 2 \cdot W) \cdot (1 + h_i/h_o) \qquad (1)$$

where S is the vol. % of sulphuric acid vapour and W is the vol. % of water vapour calculated under the assumption that $SO_3$ in the gas is completely hydrated to $H_2SO_4$, $h_i$ is the heat transfer coefficient on the inside of the tube expressed in $W/m^2/K$ and $h_o$ is the heat transfer coefficient on the outside of the tube expressed in $W/m^2/K$.

According to the invention, the acid mist concentration in the gas downstream from the filter is reduced to below 10 mole ppm $H_2SO_4$ by addition of a stream containing $NH_3$ in an amount corresponding to 0.1-20 ppm $NH_3$ by vol. in the gas stream at the entry of the tower. The required concentration of $NH_3$ in the gas is almost independent of the $H_2SO_4$ vapour concentration. The $NH_3$ may be added as 0.1-100 vol. % $NH_3$ vapour in air, but more typically 1-10 vol. % $NH_3$ in air is used. The $NH_3$-air mixture can be mixed from anhydrous $NH_3$ and air or by bubbling air through aqueous $NH_3$. The $NH_3$—containing gas is preferably preheated to above the dew point of the gas before condensation of sulphuric acid.

When the $NH_3$ is mixed with the sulphuric acid-containing gas and cooled in the condensation tower, an aerosol of ammonium hydrogen sulphate (AHS) is produced according to the reaction:

$$NH_3 + H_2SO_4 = NH_4HSO_{4(l)} \qquad (2)$$

These AHS particles or droplets act as condensation nuclei for sulphuric acid during cooling thereby favouring heterogeneous condensation and suppressing spontaneous homogeneous nucleation of new sulphuric acid droplets.

The advantages of using $NH_3$ for particle generation are that $NH_3$ is readily available and no separate particle production system is required. Since the particles are formed in the main process line, plugging of a particle injection system will also be avoided.

As an alternative to a separate filter in each condensation tube, the gas from a large number of tubes can be mixed and filtered in a common filter such as a knit-mesh high-velocity filter, a Brownian type low-velocity filter or a wet electrostatic precipitator. In this case, the sulphuric acid drain from the filter must be returned to the condenser in order to be concentrated to >90 wt % $H_2SO_4$.

EXAMPLE

In order to illustrate the invention, a series of experiments have been carried out in the experimental plant shown in FIG. 1, which shows operation of an industrial-scale sulphuric acid plant. Whereas industrial plants typically treat 10000-1000000 $Nm^3/h$ feed gas in a large number of glass tubes, the pilot plant treats only 10-20 $Nm^3/h$ in a single condensation tube. The sulphuric acid-containing gas in line 11 is prepared by mixing ambient air in line 1 with $SO_2$ in line 2, preheating the mixture in electrical heater 3 and adding water vapour from line 4 to obtain the desired gas composition. The mixture is further heated to about 420° C. in electrical heater 5 and passed through catalytic $SO_2$ converter 6 in which about 96% of the content of $SO_2$ in the gas is oxidised to $SO_3$ over a sulphuric acid catalyst of known type containing vanadium and potassium as active components. The gas is subsequently cooled to 250-290° C. ($T_1$) in cooler 7 before entering a sulphuric acid condenser consisting of a single glass tube 13 having a length of 6.7 m, an inner diameter of 36 mm and an outer diameter of 40 mm. The upper 6.2 m of the tube is encased in a larger tube 14 through which cooling air is passed from the top at a temperature $T_{A1}$ of 0-50° C. causing the gas stream in tube 13 to be cooled countercurrently to typically 100° C. ($T_2$). Outer tube 14, the non-cooled part of tube 13 and acid collector vessel 12 are insulated with 200 mm mineral wool. Sulphuric acid droplets in the gas from the tube are captured in filter 17 placed in filter cartridge 16 which is a cylindrical glass tube having a length of 200 mm and an inner diameter of 44 mm. The filter consists of filaments of a fluorocarbon polymer having a thickness of 0.3 mm and knitted to form a web having a width of about 150 mm, the web being rolled to fit into the filter cartridge. The filamentous material constitutes about 7% of the volume of the roll. When the droplets of sulphuric acid present in the gas move upwards through the roll, the droplets are caught, they agglomerate to form large drops which flow downwards in countercurrent with the gas and pass further down in the glass tube. A small stream of $NH_3$ in line 9 is added to a stream of air in line 8 and preheated to typically 300° C. in the electrical heater 10 before the mixture, which typically contains 0.1-1 vol. % of $NH_3$, is injected into the sulphuric acid-containing gas in line 11.

The acid mist concentration downstream from the filter was measured with a continuously operating photometric aerosol meter which was frequently calibrated by chemical determination of the content of $H_2SO_4$ in the gas according to the method described in EPA directive EPA-600/3-84-056 (April 1984).

As an example, a series of experiments were carried out with a gas flow rate in line 11 of 12 $Nm^3/h$, where $Nm^3$ refers to the standard conditions 0° C., 1 atm and all $SO_3$ fully hydrated to $H_2SO_4$. The gas mixture contained 3 vol. % of $H_2SO_4$ vapour and 4 vol. % of water vapour calculated under the assumption that $SO_3$ is fully hydrated. The gas mixture was cooled in the condenser from an inlet temperature $T_1$=280° C. to an outlet temperature $T_2$=100° C., while the cooling air was heated from an inlet temperature $T_{A1}$=25° C. to an outlet temperature $T_{A2}$=225° C. For these constant operating conditions, the acid mist concentration downstream from the filter has been recorded for different $NH_3$ flow in line 9.

Figure 2:
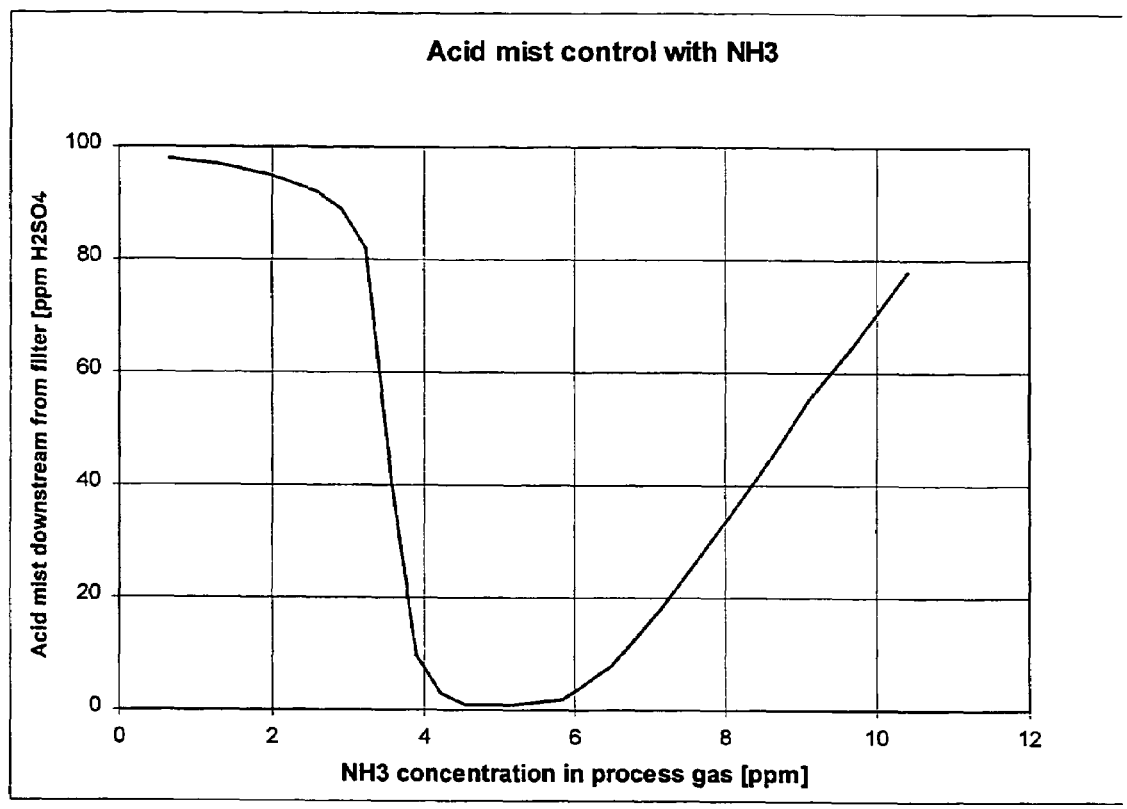
FIG. 2 is a graph showing acid mist concentration as a function of $NH_3$ concentration in the feed gas to the condenser in line 11 of FIG. 1.

FIG. 2 shows acid mist concentration as a function of $NH_3$ concentration in the feed gas to the condenser in line 11. When the gas contains 4-7 ppm $NH_3$, the acid mist downstream from the filter can be kept below 10 ppm $H_2SO_4$. At low $NH_3$ concentration, the concentration of AHS nuclei produced by reaction between $NH_3$ and $H_2SO_4$ according to reaction (2) is so small that the sub-cooling of the gas with respect to sulphuric acid condensation during cooling in the tube exceeds the critical value of 20-25 K resulting in spontaneous homogeneous nucleation of high concentrations of small sulphuric acid droplets. The subsequent growth by heterogeneous condensation of these droplets is not sufficient to ensure their removal in the filter. At high $NH_3$ concentration, the AHS nuclei concentration in the gas is so high that homogeneous nucleation of sulphuric acid vapours is suppressed. However, in this case growth by heterogeneous condensation of sulphuric acid on the nuclei is also not sufficient to ensure their removal in the filter due to the high nuclei concentration. In the window from 4 to 7 ppm $NH_3$ with 3 vol. % $H_2SO_4$ in the inlet gas, the nuclei concentration is large enough to prevent homogeneous nucleation of sulphuric acid vapours, but low enough to ensure sufficient droplet growth by heterogeneous condensation of sulphuric acid on the nuclei.

The invention claimed is:

1. A process for production of sulphuric acid comprising condensing sulphuric acid vapour from a gas mixture containing 0.01 to 10 vol. % of $H_2SO_4$ vapour calculated at complete hydration of $SO_3$ in the gas to $H_2SO_4$ and 0 to 50 vol. % of water vapour by cooling of the gas in a sulphuric acid tower, wherein a stream containing $NH_3$ is added to a gas stream entering the tower in an amount corresponding to 0.01-100 ppm $NH_3$ by vol. of the gas stream entering the tower.

2. A process of claim 1, wherein the gas mixture is cooled in a packed sulphuric acid tower counter-currently with circulating sulphuric acid as coolant.

3. A process of claim 1, wherein the cooling of the gas mixture takes place in substantially vertical, externally cooled tubes, in which the gas mixture flows from tube bottom in an upward direction in counter-current with an external coolant.

4. A process of claim 3, wherein the external coolant is in gaseous phase.

5. A process of claim 1, further comprising a step of separating droplets of sulphuric acid present in the gas downstream from the sulphuric acid tower, said droplets are passed back to the top of the sulphuric acid tower.

6. A process of claim 1, further comprising condensing from a feed gas sulphuric acid vapours which after condensation are passed in downward direction through the tubes as liquid concentrated sulphuric acid, said feed gas being introduced at bottom of the tubes at a temperature $T_1$ of at least the dew point of sulphuric acid at conditions of pressure and temperature prevailing in the tubes, the feed gas being cooled during the flow in the upward direction to a temperature $T_2$, which is lower than the temperature at which the vapour pressure of $H_2SO_4$ is $2 \cdot 10^{-6}$ bar in equilibrium with the partial pressure of water vapour prevailing at the outlet of the tubes, the tubes being cooled externally with a gaseous medium flowing substantially counter-currently with the sulphuric acid-containing gas, said gaseous medium thereby being heated from an inlet temperature $T_{A1}$ of 0 to 50° C. to an outlet temperature $T_{A2}$ satisfying the condition:

$$T_{A2} > T_1 - (75 - 6 \cdot S \cdot 2 \cdot W) \cdot (1 + - h_i/h_o)$$

where $T_{A2}$ and $T_1$ are expressed in °C., S is vol. percentage of sulphuric acid vapour and W is vol. percentage of water vapour calculated at complete hydration of $SO_3$ in the gas to $H_2SO_4$, $h_i$ is heat transfer coefficient on inside of the tube expressed in $W/m^2/K$ and $h_o$ is heat transfer co-efficient on outside of the tube expressed in $W/m^2/K$.

7. A process of claim 6, further comprising a step of separating droplets of sulphuric acid present in the gas mounted in or on top of each of the tubes in gas tight connection therewith, said droplets are caused to flow back, downwards through the tube.

8. A process of claim 6, further comprising the step of purifying the feed gas for contents of solid particles originally present before adding the $NH_3$ containing gas.

* * * * *